May 4, 1926.
Z. AUERBACH
CARD INDEX
Filed Nov. 17, 1923   2 Sheets-Sheet 1
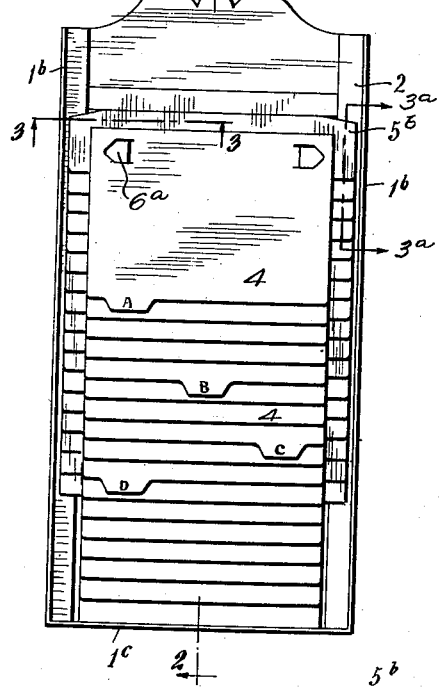
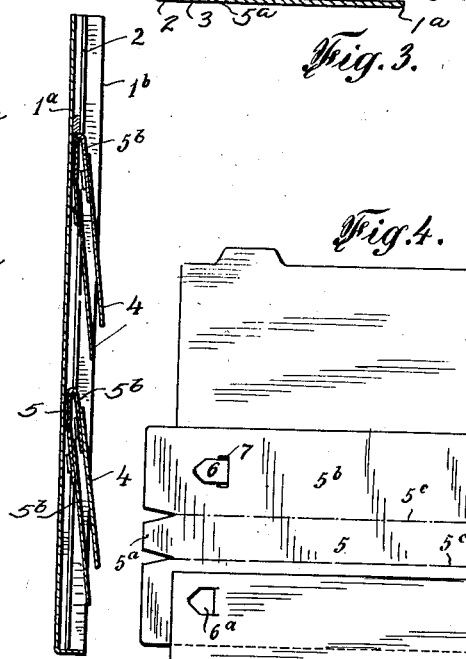
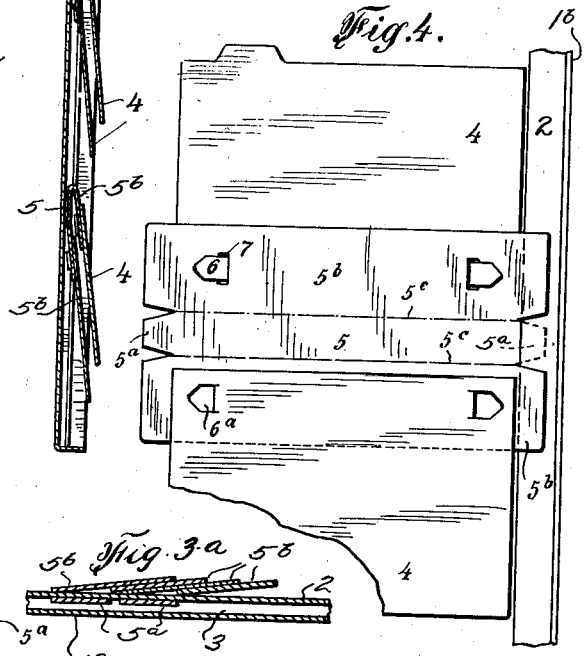
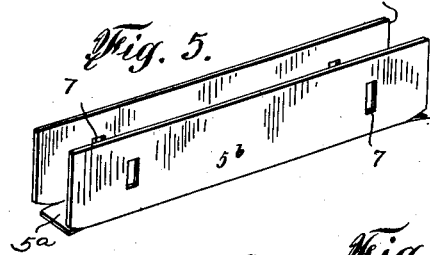
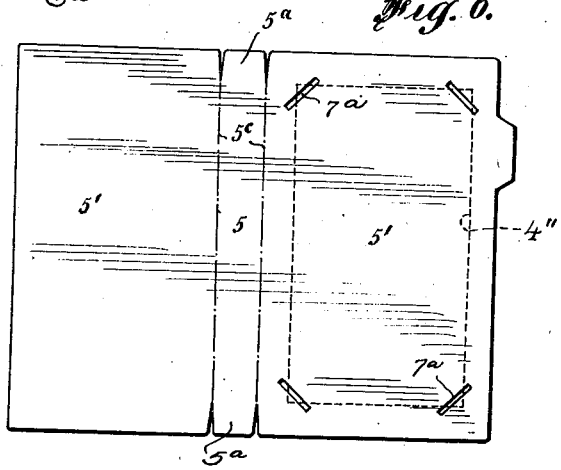
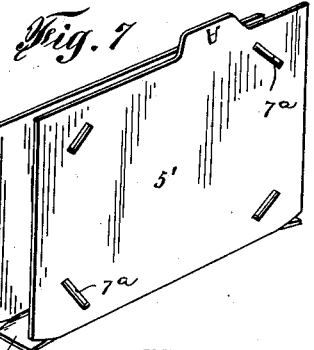
INVENTOR
Z. Auerbach
BY
P. P. Bourne
ATTORNEY May 4, 1926.
Z. AUERBACH
1,583,437
CARD INDEX
Filed Nov. 17, 1923
2 Sheets-Sheet 2
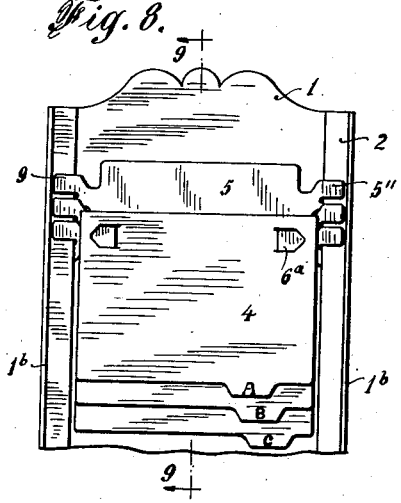
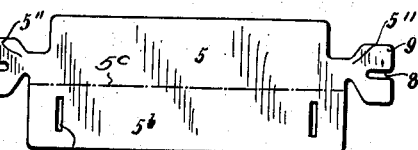
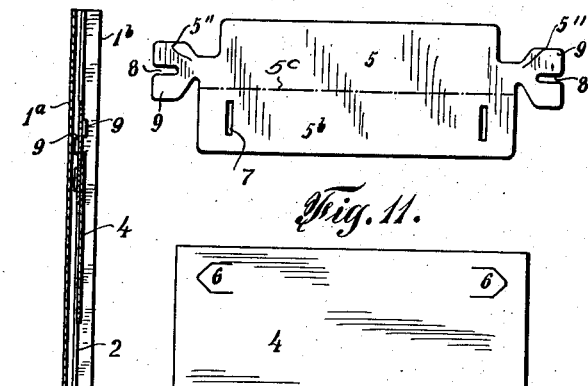
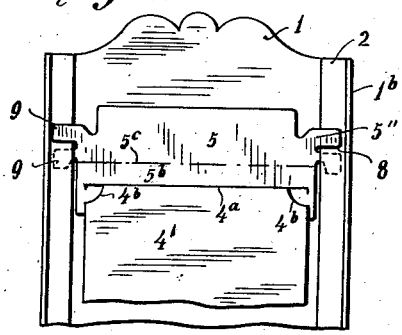
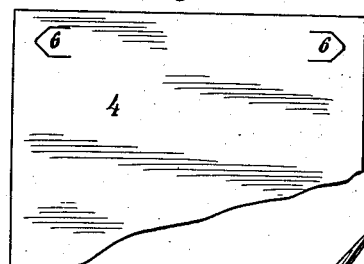
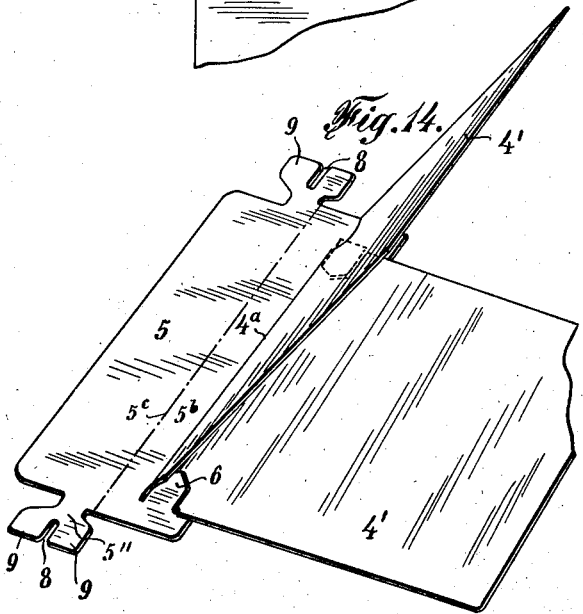
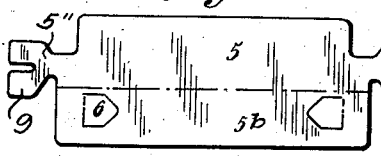
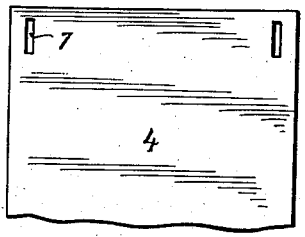
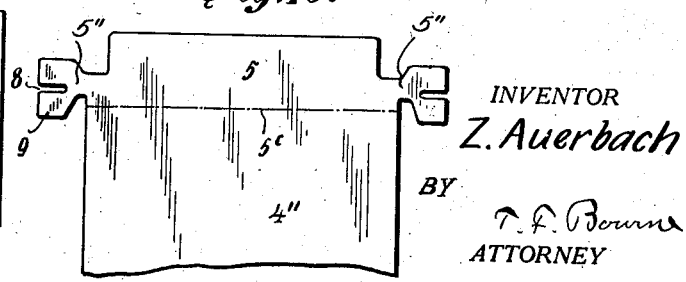
INVENTOR
Z. Auerbach
BY
ATTORNEY Patented May 4, 1926.

1,583,437

UNITED STATES PATENT OFFICE.

ZEMACH AUERBACH, OF NEW YORK, N. Y.

CARD INDEX.

Application filed November 17, 1923. Serial No. 675,274.

*To all whom it may concern:*

Be it known that I, ZEMACH AUERBACH, a citizen of Russia, and resident of New York city, in the county of New York and State of New York, have invented certain new and useful Improvements in Card Indexes, of which the following is a specification.

My invention relates to improvements in the class of card indexes, filing racks or devices and the like in which the cards or sheets lie superposed in a consecutive way retained in a rack or holder for convenient use and replacement.

One of the objects of my invention is to provide means for pivotally supporting the cards in the rack in such a manner that either side of the cards may be written upon and whereby the cards may be readily detached and replaced.

In a preferred form of my invention I provide a card-retaining member having a hinged portion or wing with cooperating means between the card and the hinge portion or wing for detachably connecting them, said member being provided with means to detachable connect it with the rack.

My invention also comprises novel details of improvement that will be more fully hereinafter set forth and then pointed out in the claims.

Reference is to be had to the accompanying drawings forming a part hereof, wherein Fig. 1 is a front view of a card rack or filing device embodying my invention;

Fig. 2 is a longitudinal section on line 2, 2, in Fig. 1;

Fig. 3 is an enlarged detail cross section on line 3, 3, in Fig. 1;

Fig. 3ª is a longitudinal section on line 3ª, 3ª, in Fig. 1;

Fig. 4 is a plan view illustrating two cards attached to the retaining member of Fig. 1;

Fig. 5 is a perspective detail of the retaining member;

Figs. 6 and 7 illustrate a modified form of the retaining member and card;

Fig. 8 is a face view illustrating single-card retaining members in the rack;

Fig. 9 is a section on line 9, 9, in Fig. 8;

Fig. 10 is a detail of the card-retaining member of Fig. 8;

Fig. 11 is a detail of the card of Figs. 1 to 4 and 8;

Fig. 12 is a detail illustrating a modified form of a card in the rack, in which the card comprises two leaves;

Fig. 13 is a face view illustrating the card-retaining member of Fig. 12;

Fig. 14 is a perspective view illustrating the card of Fig. 12;

Fig. 15 illustrates a modified form of card for the retaining member of Fig. 13, and Fig. 16 illustrates a card and its retaining member in a single piece.

Similar numerals of reference indicate corresponding parts in the several views.

A rack for the cards is indicated at 1, shown comprising a bottom plate 1ª having spaced side walls 1ᵇ and an end wall 1ᶜ. The side walls 1ᵇ have longitudinal guides 2 projecting inwardly over the bottom plate 1ª and spaced therefrom to guide and retain the card-holders. The guides 2 may be formed by bending the material of the side walls 1ᵇ inwardly and along said walls providing inner walls at 2ᶜ and extending the guides 2 inwardly over the bottom, as indicated in Fig. 3. The construction described provides longitudinal spaces 3 between the guides 2 and bottom plate 1ª and also provides the juxtaposed walls 1ᵇ and 2ᶜ that project beyond the corresponding guides 2, affording webs that protect the cards in the rack from accidental displacement by lateral movements of a user's hands over the rack.

Cards are indicated at 4 and may be single-ply, or may be double-ply 4', as indicated in Figs. 12 and 14. At 5 is indicated one of the retaining members for the cards, the projecting end portions 5ª of which members are adapted to be located between the bottom plate 1ª and the guides 2 of the rack for slidably and detachably retaining said members in the rack. The members 5 are provided with means to pivotally support the cards either detachably or in an integral unit. In the form shown in Figs. 1 to 4 the retaining members 5 are each provided with two wings 5ᵇ pivoted or hinged at opposite edges of the member along the hinge lines or creases 5ᶜ, to which wings the cards are detachably connected. Said wings 5ᵇ are substantially the same length as the members 5 and their projections 5ª, being free at their end portions from said projections. In the form illustrated in said figures the cards are provided with tongues 6 cut out from openings 6ª, (Fig. 3), and adapted to enter openings 7, shown in the form of slots, in the wings 5ᵇ. The tongues 6 and openings 7 are suitably spaced apart so that the tongues may be passed through the openings to attach the cards to the wings whereby the cards may be detached as desired. If preferred the tongues 6 may be on the wings 5ᵇ and the openings or slots 7 may be in the card, as illustrated in Figs. 13 and 15. When the cards are assembled on the wings of the retaining members the latter may be applied in the rack by suitably bending the same to slip their end portions 5ª in the spaces 3 between the bottom plate 1ª and guides 2, whereby the members and attached cards will be slidably and detachably retained in the rack in such a manner that the cards may lie upon one another in successive relation, the appropriate wing 5ᵇ folding upon the hinge line 5ᶜ, in which position the end portions of the wings 5ᵇ will overlie the guides 2 and the end portions of the outermost wing 5ᵇ will overlie the companion projections 5ª that are under the guides 2, whereby the wings of one member will overlie an adjacent member and the corresponding projections 5ª under the guides 2 will engage one another, edge to edge, to space said members apart and prevent them from sliding on top of one another along the rack. The construction described is such that the cards may be swung back and forth along the hinge lines 5ᶜ for access to either side of the corresponding card for writing on or reading the same.

In the form shown in Figs. 6 and 7, the wings are made sufficiently large to be used as cards hinged upon the hinge lines 5ᶜ of the retaining members 5 as indicated at 5′. One or both of such wings may be provided with slots 7ª shown angularly disposed in rectangular relation adapted to receive the corners of the cards indicated at 4″, which may be tucked into said slots, as indicated in dotted lines in Fig. 6. for detachably connecting the cards with the members. The wings 5′ extend laterally respecting the projections 5ª in such a way as to overlie said projections when the outer wing is folded over the inner wing and the member 5, with the projections under the guides 2, whereby the overlying wing will encounter an adjacent wing or member to space the same apart and prevent them from sliding on top of one another along the rack, in manner before described.

In Figs. 8 to 14 the retaining members have each a single wing 5ᵇ pivoted or hinged along the line 5ᶜ and the projecting end portions 5″ of the members are provided with longitudinal slits 8 providing pairs of prongs 9 at each end, whereby the projecting portions 5ª may be applied to the guides 2 of the rack in such a way that said guides will enter the slits 8 and the corresponding prongs 9 will extend on opposite sides of the guides, whereby the retaining members will be slidably and detachably retained in the rack. The construction is such that the wings 5ᵇ may swing with the cards along the hinge lines 5ᶜ and the retaining members may be tucked closely together so that the wing of one member may overlie another member and part of its wing, whereby a relatively large number of the members and cards may be retained in the rack and are spaced by the engagement of the adjacent prongs.

The cards need not be single-ply but may be two-ply, that is to say, the cards may be folded along a crease line 4ª, (Fig. 14), and preferably have their corners at such line cut away at 4ᵇ, (Fig. 12), to engage the tongues 6 on the wings 5ᵇ, whereby the cards may be detachably connected with the wings and may be relatively wide. This construction permits a plurality of leaves to be provided for each card, and a plurality of such folding cards may be tucked together to be retained by the tongues 6 of a single wing 5ᵇ to increase the number of cards applied to a single alphabetical letter, it being understood that the cards may be provided with tabs marked with alphabetical letters, as illustrated at A, B, C, etc., or in any desired manner.

In Fig. 16 the retaining member 5 and the card 4″ are in a single piece united at the hinge line 5ᶜ, in this construction the projections being shown provided with the slits 8 and prongs 9.

In accordance with my invention the retaining members with their wings and cards may be applied in a rack in close relation to accommodate a relatively large number of cards, which are arranged to lie upon one another in series or consecutively, and are adapted to be swung back and forth while in the rack in such a manner that access may be had to either side of any card for writing thereon or for reading the same, and whereby any card may be readily detached and replaced by a fresh card, as the use of the rack may demand. The arrangement is such, also, that the racks may be made relatively shallow so that a considerable number of the racks may be stored in a cabinet having slideways for the racks. Any of the retaining members may be removed and replaced as may be required, although the cards may be removed and replaced without removing the retaining members, except with respect to the form shown in Fig. 16.

The retaining member 5 and its wing or wings 5ᵇ, as well as the form shown in Fig. 16, may be of any suitable material, such as linen card board, whereby the parts may fold along the crease or hinge lines 5ᶜ without injury. Loose cards may be placed between the wings or cards, using the latter in the nature of folders for cards.

Having now described my invention what I claim is:—

1. A device of the class described comprising a retaining member having projecting end portions adapted to engage a rack, and wings pivotally connected with said member along opposite edges thereof, said wings being of such length as to overlie the member and its projecting end portions when a wing is folded over the member, both of said wings being arranged to fold over and away from said member and to lie one upon the other.

2. A device of the class described comprising a retaining member having projecting end portions adapted to engage a rack and provided with wings pivotally connected with said member along its longitudinal edges, and free from said end portions at the ends of the wings, said wings being of such length as to overlie said end portions, both of said wings being arranged to fold over and away from said member and to lie one upon the other.

3. A device of the class described comprising a retaining member having end portions adapted to engage a rack and provided with a wing pivotally connected with said member at its edge and free from said end portions at the ends of the wing, said wings being of such length as to overlie said end portions, and a card, said wing and card having interengageable means to detachably connect them together.

4. A device of the class described comprising a retaining member having end portions adapted to engage a rack and provided with wings pivotally connected with said member along its opposite edges, said wings being free from said end portions at the ends of the wings, said wings being of such length as to overlie said end portions, each of said wings being foldable over the member and adapted to lie one upon another.

5. A device of the class described comprising a retaining member having end portions to engage a rack, wings pivotally connected with the member on opposite sides thereof, cards, and means to detachably connect said cards with said wings.

6. A device of the class described comprising a retaining member having end portions to engage a rack, wings pivotally connected with the member on opposite sides thereof, and cards, said wings and cards having interengageable complemental tongues and slots for detachably connecting them together.

7. A device of the class described comprising a retaining member and a card connected therewith, said member having end portions provided with slots, and prongs on opposite sides of said slots adapted to engage a rack.

8. A device of the class described comprising a retaining member provided with a wing pivotally attached thereto, said member having projecting end portions provided with slots and prongs on opposite sides of said slots, a card, and means to detachably connect the card and said wing.

9. A device of the class described comprising a retaining member provided with a wing pivotally attached thereto, said member having projecting end portions provided with slots and prongs on opposite sides of said slots, and a card, said wing being provided with spaced tongues adapted to engage a card.

10. A device of the class described comprising a rack having a bottom and spaced guides located at a distance from said bottom, a retaining member having projecting portions to engage said guides, and wings pivotally connected with said member along opposite longitudinal edges thereof, said wings being of such dimensions as to be adapted to overlie said member and its projecting portions over the guides, each of said wings being foldable over the member and adapted to lie one upon another.

11. A device of the class described comprising a rack having a bottom and spaced side walls extending therefrom, inner walls connected to the outer parts of said side walls and extending toward said bottom, and guides extending inwardly from the inner walls and located at a distance from said bottom and from the outer edges of said walls.

12. A device of the class described comprising a rack having a bottom and spaced side walls provided with inwardly extending guides spaced from said bottom, said walls extending outwardly beyond said guides, a retaining member having projecting portions to engage said guides, and wings pivotally connected with opposite edges of said member, said wings being of such dimensions as to overlie the guides and be adapted to lie over one another.

13. A device of the class described comprising a rack having a bottom and spaced side walls provided with inwardly extending guides spaced from said bottom, said walls extending outwardly beyond said guides, a retaining member having projecting portions to engage said guides, said member having wings pivotally connected therewith along opposite edges of the member and of such dimensions as to be adapted to overlie said guides and one another, a card, and means detachably connecting the card with one of the wings.

14. A device of the class described comprising a piece of flexible material including a retaining member and a wing integral therewith and hinged thereto along a score line at one of the edges of the member to fold over the latter, said member having projecting end portions free from the ends of the wing, said wing being of such length as to be adapted to overlie said projecting end portions.

15. A device of the class described comprising a piece of flexible material including a retaining member and wings integral therewith and hinged thereto along score lines at opposite edges of the member to fold relatively to the latter and to fold one upon another, said member having projecting end portions free from the ends of the wings, said wings being of such dimensions as to be adapted to overlie said projecting end portions alternately and to overlie one another.

ZEMACH AUERBACH.